UNITED STATES PATENT OFFICE.

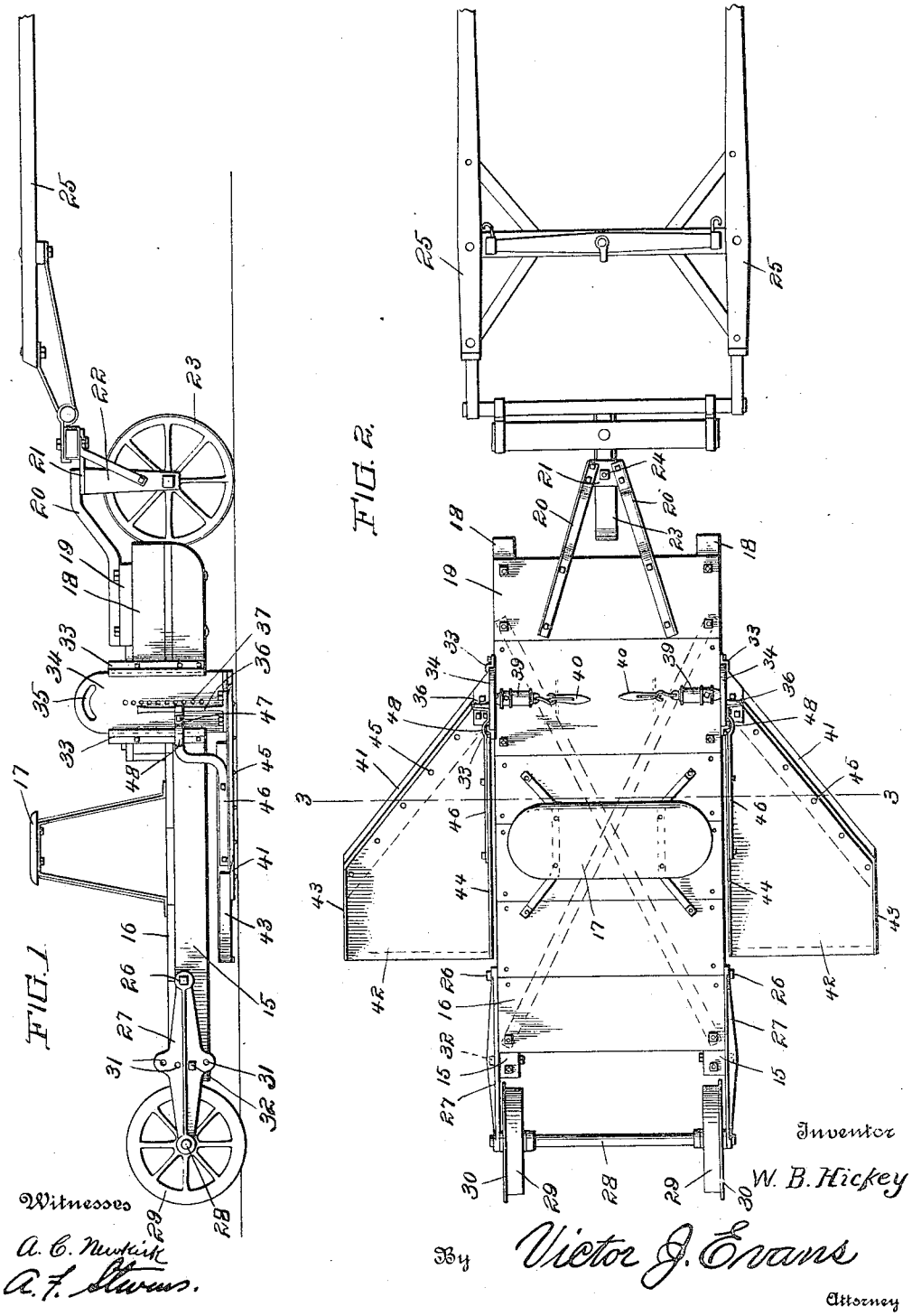

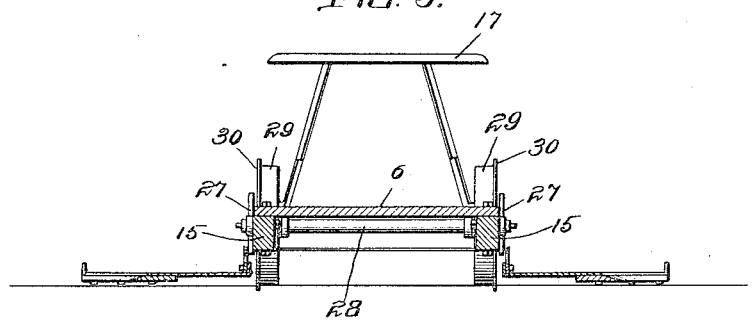
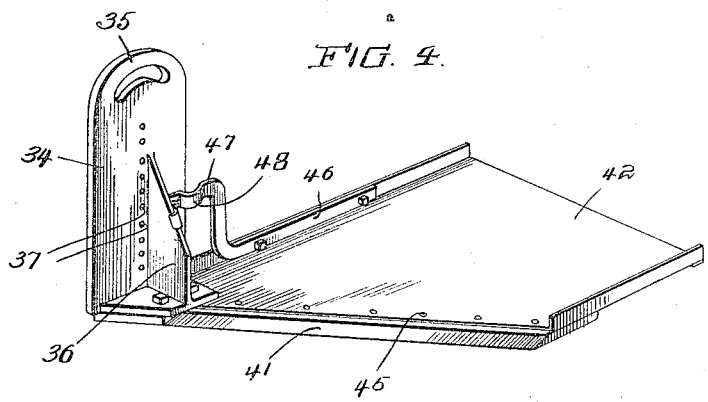
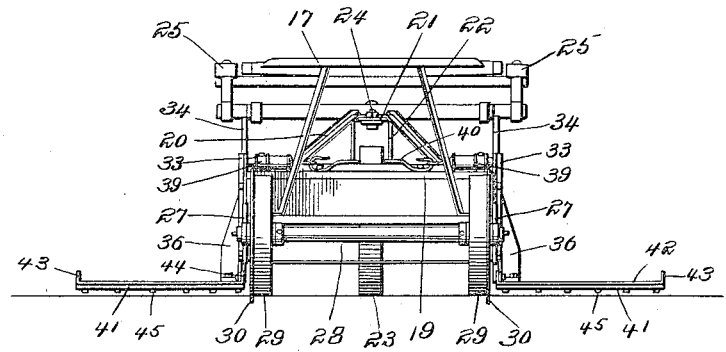

WILLIAM B. HICKEY, OF SAPULPA, OKLAHOMA.

CORN-CUTTER, &c.

1,214,460.  Specification of Letters Patent.  Patented Jan. 30, 1917.

Application filed September 4, 1915. Serial No. 48,983.

*To all whom it may concern:*

Be it known that I, WILLIAM B. HICKEY, a citizen of the United States, residing at Sapulpa, in the county of Creek and State of Oklahoma, have invented new and useful Improvements in Corn-Cutters, &c., of which the following is a specification.

This invention relates to machines for cutting green or dry corn stalks, cotton stalks, Kafir corn, maize, cow peas, navy beans and any other plants that are growing in rows.

The invention has for its object to produce a simple, improved and easily guided machine for cutting plants, as aforesaid.

A further object of the invention is to produce a simple and improved machine having vertically adjustable knives or cutters which may be provided with detachable aprons or platforms, said platforms being particularly useful and serviceable when corn and the like is to be cut that is to be piled on the platform of the machine, while such auxiliary platforms or aprons are dispensed with when the knives or cutters are to operate beneath the surface of the ground.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings, Figure 1 is a side elevation of a machine constructed in accordance with the invention. Fig. 2 is a top plan view of the same. Fig. 3 is a transverse sectional view taken on the line 3—3 in Fig. 2. Fig. 4 is a perspective detail view showing one of the cutting members detached, together with the slide and the apron associated with said cutting member. Fig. 5 is a rear elevation.

Corresponding parts in the several figures are denoted by like characters of reference.

The frame of the improved machine includes sills or side members 15 which are connected together by planking 16 constituting a platform on which the seat 17 is mounted. The forward end of the frame in advance of the seat 17 supports auxiliary sills 18 and an elevated platform 19, the latter serving to support forwardly extending convergent channel beams or angle beams 20, said beams being connected together by a cross piece or plate 21 with which the front truck 22 having a single wheel 23 is pivotally connected by a pin or king bolt 24. For the attachment of a draft animal thills or shafts 25 are provided, the same being connected with the front truck in any convenient manner to enable said front truck to be turned about the axis of the king bolt for the purpose of guiding the machine.

Pivoted on the outer faces of the sills 15, near the rear ends of the latter, by means of bolts or pivot members 26 are brackets or arms 27, the same extending to the rearward of the sills and affording bearings for an axle 28 having ground engaging wheels 29, said wheels being each provided with a flange 30 to prevent skidding. Each arm 27 is provided with a series of perforations 31 arranged in concentric relation to the pivot member 26 for the passage of a bolt or fastening member 32, whereby the arm may be adjustably connected with the sill 15, thus providing for the raising or lowering of the rear end of the frame by vertical adjustment with respect to the ground wheels.

The frame is provided at its forward end with flanged guide plates 33, the same being secured on the sills 15 and auxiliary sills 18 for the purpose of guiding the vertically movable slides 34, each of which is provided with a grip or hand hold 35. Each of the slides is also provided with a reinforcing web 36 and with a vertical series of perforations 37, the latter adapted to be engaged by a spring actuated bolt mounted in a housing 39 on the inner face of the guide plate, said spring actuated bolts being adapted to be retracted by foot levers or treadles 40 connected therewith. When the bolts are thus retracted, it is evident that the slides may be moved vertically to the desired position, after which by releasing the bolts to engage some of the apertures 37 the slides will be securely retained at the desired adjustment. Securely bolted upon and connected with the lower ends of the slides 34 are obliquely disposed knives or cutters 41, the same diverging rearwardly, as will be seen. Detachable shields or aprons 42 are provided, the same having upturned outer and inner side edges forming flanges 43, 44 and oblique front edges, said shields or aprons being mounted on the cutters 41 with which they are detachably connected by screws 45. The upturned outer and inner flanges 43, 44 serve to give strength and rigidity to the aprons. Secured on the upturned inner flanges 44 are bars 46, the forward ends of which are turned upward and then forward to form arms 47 which are secured on the slides 34, said arms having bulging or offset portions 48 to clear the flanges of the plates 33, and also to engage the reinforcing webs 36 of the slides 34 thereby forming a strong bracing connection between the slides and the aprons which will prevent the latter from sagging under the weight which in operation will be imposed thereon. The offset portion 48 may be regarded as a hook engaging the web 36, requiring no bolt or rivet connection and, therefore, easily disassembled when the aprons are to be detached.

It will be seen that by drawing the improved machine over the ground between two rows of growing plants, said plants may be cut any desired distance above the ground by proper adjustment of the slides carrying the cutting members. When used for cutting corn and the like the shields or aprons 42 are extremely useful inasmuch as they serve to support the butts of the stalks while the latter are being gathered by the operators who are stationed on the machine, such stalks being piled on the platform until a suitable load has been accumulated. When the material that is cut is to be left in the field the shields are detached. This is also the case when the stalks are to be cut below the surface of the ground. By proper adjustment of the arms or brackets carrying the rear axle the frame of the machine may be tilted to the most advantageous position for effective operation. The machine may be drawn by a single draft animal, and by reason of the mounting of the front truck as herein described, it may be conveniently guided and manipulated.

Having thus described the invention, what is claimed as new, is:—

In a machine of the class described, a wheeled frame, flanged guide plates secured on the outer faces thereof, slides guided therein and having vertically disposed webs, obliquely disposed cutters secured on the slides, aprons supported on the cutters and having upturned side edges forming outer and inner flanges, and bars secured on the inner flanges and having upturned front ends with forwardly extending arms, said arms having offsets forming hooks that engage the webs of the slides.

In testimony whereof I affix my signature in presence of two witnesses.

WILLIAM B. HICKEY.

Witnesses:
W. P. TONQUEVILLE,
FANNIE MAY WILLIAMS.

Copies of this patent may be obtained for five cents each, by addressing the "Commissioner of Patents, Washington, D. C."